(12) United States Patent
Flynn

(10) Patent No.: US 10,099,591 B2
(45) Date of Patent: Oct. 16, 2018

(54) DUAL CONFIGURATION HEADREST SYSTEM

(71) Applicant: David Flynn, Placerville, CA (US)

(72) Inventor: David Flynn, Placerville, CA (US)

(*) Notice: Subject to any disclaimer, the term of this patent is extended or adjusted under 35 U.S.C. 154(b) by 14 days.

(21) Appl. No.: 15/366,807

(22) Filed: Dec. 1, 2016

(65) Prior Publication Data
US 2018/0154810 A1 Jun. 7, 2018

(51) Int. Cl.
*B60N 2/838* (2018.01)
*B60N 2/868* (2018.01)

(52) U.S. Cl.
CPC .............. *B60N 2/838* (2018.02); *B60N 2/868* (2018.02)

(58) Field of Classification Search
CPC ........... B60N 2002/022; B60N 2/4879; B60N 2/4808; B60N 2/4867; B60N 2/48; B60N 2/838; B60N 2/4838; B60N 2/4855; B60N 2/2851; B60N 2002/0208; B60R 2011/0017; B60R 2011/0085; B60R 2011/0082; B60R 2011/0075; B60R 11/0229
See application file for complete search history.

(56) References Cited

U.S. PATENT DOCUMENTS

| | | | | |
|---|---|---|---|---|
| 4,205,878 A * | 6/1980 | Wooten | ..................... | A47C 7/38 297/391 |
| 4,681,366 A * | 7/1987 | Lobanoff | ............. | B60N 2/4876 248/475.1 |
| 4,682,817 A * | 7/1987 | Freber | .................. | B60N 2/4847 297/408 |
| 4,733,913 A * | 3/1988 | Tateyama | ............... | B60N 2/847 297/409 |
| 4,762,367 A * | 8/1988 | Denton | .................. | B60N 2/865 297/409 |
| D309,393 S * | 7/1990 | Talaugon | ........................ | D6/601 |
| D312,019 S * | 11/1990 | Woods | ........................... | D6/601 |
| 5,020,855 A * | 6/1991 | Lindberg | ............... | B60N 2/838 297/391 |
| 5,411,468 A * | 5/1995 | Chen | ..................... | B60N 2/4838 297/217.3 |
| 5,531,505 A * | 7/1996 | Baetz | .................. | B60N 2/4847 297/408 |
| 5,669,668 A * | 9/1997 | Leuchtmann | ........ | B60N 2/4858 297/403 |
| 5,752,742 A * | 5/1998 | Kerner | ..................... | B60N 2/48 297/391 |
| 5,997,091 A * | 12/1999 | Rech | .................... | B60N 2/4838 297/217.3 |

(Continued)

*Primary Examiner* — James M Ference

(57) ABSTRACT

A dual configuration headrest system includes a seat having a top side and a back edge. A backrest is attached to the seat and extends upwardly from the top side. A housing is attached the backrest and is positioned over an upper edge of the backrest. The housing has a top wall, a bottom wall, first lateral wall and a second lateral wall. A front side of the housing is open. A head support is mounted within the housing and has a first side and a second side positioned opposite of each other. The head support further has a top side, a bottom side, a first lateral side and a second lateral side. The head support is rotationally mounted within the housing such that the first side or the second side is positioned in an opening in the front side when the head support is rotated relative to the housing.

8 Claims, 4 Drawing Sheets

(56) References Cited

U.S. PATENT DOCUMENTS

| | | | | |
|---|---|---|---|---|
| D428,295 S * | 7/2000 | Frye | | D6/601 |
| 6,120,099 A * | 9/2000 | Reikerås | | B60N 2/4808 |
| | | | | 297/391 |
| 6,220,668 B1 * | 4/2001 | Scheffzuck | | B60N 2/4802 |
| | | | | 297/391 |
| 6,250,716 B1 * | 6/2001 | Clough | | A47C 7/383 |
| | | | | 297/408 |
| 6,305,749 B1 * | 10/2001 | O'Connor | | A47C 7/383 |
| | | | | 297/397 |
| 6,470,532 B2 * | 10/2002 | Rude | | G06F 1/1616 |
| | | | | 16/313 |
| 6,513,871 B2 * | 2/2003 | Bartels | | B60N 2/4808 |
| | | | | 297/216.12 |
| 6,616,235 B1 * | 9/2003 | Khavari | | B60N 2/4847 |
| | | | | 297/408 |
| 6,648,416 B2 * | 11/2003 | O'Connor | | A47C 7/383 |
| | | | | 297/397 |
| 6,682,143 B2 * | 1/2004 | Amirault | | B60N 2/2851 |
| | | | | 297/250.1 |
| 6,692,071 B2 * | 2/2004 | Fowler | | B60N 2/4235 |
| | | | | 297/216.12 |
| 6,871,356 B2 * | 3/2005 | Chang | | B60R 11/0235 |
| | | | | 348/837 |
| 6,974,188 B2 * | 12/2005 | Turner | | A47C 4/04 |
| | | | | 297/270.2 |
| 7,040,697 B1 * | 5/2006 | Tuccinardi | | B60N 2/4876 |
| | | | | 297/188.04 |
| 7,073,856 B2 * | 7/2006 | Akaike | | B60N 2/0232 |
| | | | | 297/216.12 |
| 7,073,863 B1 * | 7/2006 | Low | | B60N 2/865 |
| | | | | 297/404 |
| 7,350,859 B2 * | 4/2008 | Klukowski | | B60N 2/888 |
| | | | | 297/216.12 |
| 7,597,393 B1 * | 10/2009 | Tuccinardi | | B60R 11/0211 |
| | | | | 297/188.04 |
| 7,611,196 B2 * | 11/2009 | Terada | | B60N 2/888 |
| | | | | 297/216.12 |
| 7,717,507 B2 * | 5/2010 | Toda | | B60N 2/862 |
| | | | | 297/216.12 |
| 7,780,231 B2 * | 8/2010 | Shalam | | B60R 11/0235 |
| | | | | 297/217.3 |
| 7,992,933 B2 * | 8/2011 | Yetukuri | | B60N 2/4228 |
| | | | | 297/216.12 |
| 8,033,603 B2 * | 10/2011 | Meert | | B60N 2/4879 |
| | | | | 297/216.12 |
| 8,038,219 B2 * | 10/2011 | Boes | | B60N 2/888 |
| | | | | 297/410 |
| 8,100,472 B2 * | 1/2012 | Humer | | B60N 2/4228 |
| | | | | 297/216.12 |
| 8,388,060 B2 * | 3/2013 | Chang | | B60R 11/0235 |
| | | | | 297/217.3 |
| 8,657,379 B2 * | 2/2014 | Humer | | B60N 2/859 |
| | | | | 297/408 |
| 8,899,685 B2 * | 12/2014 | Haeske | | B60N 2/809 |
| | | | | 297/410 |
| 9,216,676 B1 * | 12/2015 | Reyes Luna | | B60N 2/449 |
| 9,327,836 B2 * | 5/2016 | Weitzel | | B64D 11/06 |
| 9,446,694 B2 * | 9/2016 | Szczygiel | | B60N 2/4882 |
| 9,463,725 B2 * | 10/2016 | Szczygiel | | B60N 2/4882 |
| 2002/0033628 A1 * | 3/2002 | Clough | | A47C 7/38 |
| | | | | 297/410 |
| 2002/0084686 A1 * | 7/2002 | Takata | | B60N 2/4855 |
| | | | | 297/408 |
| 2002/0152553 A1 * | 10/2002 | Wynveen | | A47C 7/383 |
| | | | | 5/636 |
| 2002/0158499 A1 * | 10/2002 | Clough | | A47C 7/38 |
| | | | | 297/410 |
| 2003/0038521 A1 * | 2/2003 | Johnson | | A47C 7/383 |
| | | | | 297/397 |
| 2004/0007910 A1 * | 1/2004 | Skelly | | A47C 7/38 |
| | | | | 297/406 |
| 2004/0032543 A1 * | 2/2004 | Chang | | B60R 11/0235 |
| | | | | 348/837 |
| 2004/0195893 A1 * | 10/2004 | Clough | | A47C 7/38 |
| | | | | 297/391 |
| 2004/0212745 A1 * | 10/2004 | Chang | | B60R 11/0235 |
| | | | | 348/837 |
| 2005/0006941 A1 * | 1/2005 | Park | | B60N 2/4852 |
| | | | | 297/406 |
| 2005/0013100 A1 * | 1/2005 | Stephany | | B60R 11/0229 |
| | | | | 361/679.27 |
| 2005/0077762 A1 * | 4/2005 | Kraemer | | B60N 2/865 |
| | | | | 297/216.12 |
| 2005/0099547 A1 * | 5/2005 | Vitito | | B60K 35/00 |
| | | | | 348/739 |
| 2005/0110313 A1 * | 5/2005 | Vitito | | B60N 2/4876 |
| | | | | 297/217.3 |
| 2005/0121963 A1 * | 6/2005 | Williamson | | B60N 2/01508 |
| | | | | 297/408 |
| 2005/0141181 A1 * | 6/2005 | Stephany | | B60R 11/0229 |
| | | | | 361/679.27 |
| 2005/0253440 A1 * | 11/2005 | Kotani | | B60N 2/885 |
| | | | | 297/410 |
| 2006/0001307 A1 * | 1/2006 | Embach | | B60N 2/4876 |
| | | | | 297/391 |
| 2006/0033374 A1 * | 2/2006 | Pos | | B60N 2/2851 |
| | | | | 297/397 |
| 2006/0070103 A1 * | 3/2006 | Vitito | | B60K 35/00 |
| | | | | 725/77 |
| 2006/0072286 A1 * | 4/2006 | Tseng | | G09F 9/30 |
| | | | | 361/679.22 |
| 2006/0119151 A1 * | 6/2006 | Vitito | | B60K 35/00 |
| | | | | 297/217.3 |
| 2007/0222248 A1 * | 9/2007 | Maulden | | B60N 2/4876 |
| | | | | 296/37.15 |
| 2008/0203788 A1 * | 8/2008 | Hattori | | B60N 2/879 |
| | | | | 297/217.3 |
| 2008/0246319 A1 * | 10/2008 | Chang | | B60R 11/0235 |
| | | | | 297/217.3 |
| 2008/0246320 A1 * | 10/2008 | Chang | | B60R 11/0235 |
| | | | | 297/217.3 |
| 2008/0252798 A1 * | 10/2008 | Vitito | | B60K 35/00 |
| | | | | 348/837 |
| 2009/0089841 A1 * | 4/2009 | Hanlon | | B60R 11/02 |
| | | | | 725/75 |
| 2009/0151075 A1 * | 6/2009 | Arthur | | B60N 2/7005 |
| | | | | 5/636 |
| 2009/0174238 A1 * | 7/2009 | Kuno | | B60N 2/4876 |
| | | | | 297/217.3 |
| 2009/0225238 A1 * | 9/2009 | Vitito | | B60R 11/0235 |
| | | | | 348/837 |
| 2009/0309406 A1 * | 12/2009 | Campa | | B60N 2/245 |
| | | | | 297/397 |
| 2009/0315370 A1 * | 12/2009 | Hartlaub | | F16C 1/101 |
| | | | | 297/216.12 |
| 2010/0123344 A1 * | 5/2010 | Villeminey | | B60N 2/002 |
| | | | | 297/391 |
| 2010/0127548 A1 * | 5/2010 | Truckenbrodt | | B60N 2/865 |
| | | | | 297/391 |
| 2010/0244505 A1 * | 9/2010 | Demick | | B60N 2/4876 |
| | | | | 297/188.04 |
| 2010/0283306 A1 * | 11/2010 | Boes | | B60N 2/4882 |
| | | | | 297/408 |
| 2011/0084524 A1 * | 4/2011 | Werner | | B60N 2/865 |
| | | | | 297/216.12 |
| 2011/0181796 A1 * | 7/2011 | Caltabiano | | B60R 11/0235 |
| | | | | 348/837 |
| 2012/0212025 A1 * | 8/2012 | Schroeder | | B60N 2/874 |
| | | | | 297/391 |
| 2012/0280542 A1 * | 11/2012 | Wood | | B60N 2/879 |
| | | | | 297/180.1 |
| 2012/0292973 A1 * | 11/2012 | Westerink | | B64D 11/06 |
| | | | | 297/391 |
| 2012/0299356 A1 * | 11/2012 | Edwards | | B60N 2/4879 |
| | | | | 297/397 |
| 2013/0015687 A1 * | 1/2013 | Kramer | | B60N 2/4876 |
| | | | | 297/217.3 |

(56) References Cited

U.S. PATENT DOCUMENTS

| | | | |
|---|---|---|---|
| 2013/0221722 A1* | 8/2013 | Navarro | B60N 2/4882 297/391 |
| 2013/0234490 A1* | 9/2013 | Millan | B60N 2/4808 297/391 |
| 2014/0042781 A1* | 2/2014 | Reeves | B60N 3/004 297/163 |
| 2014/0077539 A1* | 3/2014 | Brawner | B60R 11/02 297/217.3 |
| 2014/0152057 A1* | 6/2014 | Truant | B60N 2/4876 297/180.12 |
| 2014/0312672 A1* | 10/2014 | Scolari | B60N 2/4808 297/391 |
| 2014/0339875 A1* | 11/2014 | Sunaga | B60N 2/4838 297/408 |
| 2015/0015048 A1* | 1/2015 | Kapusky | B60N 2/844 297/408 |

* cited by examiner

DUAL CONFIGURATION HEADREST SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to chair headrest devices and more particularly pertains to a new chair headrest device for allowing a person to select the type of head support they will receive from the headrest.

BRIEF SUMMARY OF THE INVENTION

An embodiment of the disclosure meets the needs presented above by generally comprising a seat having a top side and a back edge. A backrest is attached to the seat adjacent to the back edge and extends upwardly from the top side. A housing is attached the backrest and is positioned over an upper edge of the backrest. The housing has a top wall, a bottom wall, first lateral wall and a second lateral wall. A front side of the housing is open. A head support is mounted within the housing and has a first side and a second side positioned opposite of each other. The head support further has a top side, a bottom side, a first lateral side and a second lateral side. The head support is rotationally mounted within the housing such that the first side or the second side is positioned in an opening in the front side when the head support is rotated relative to the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
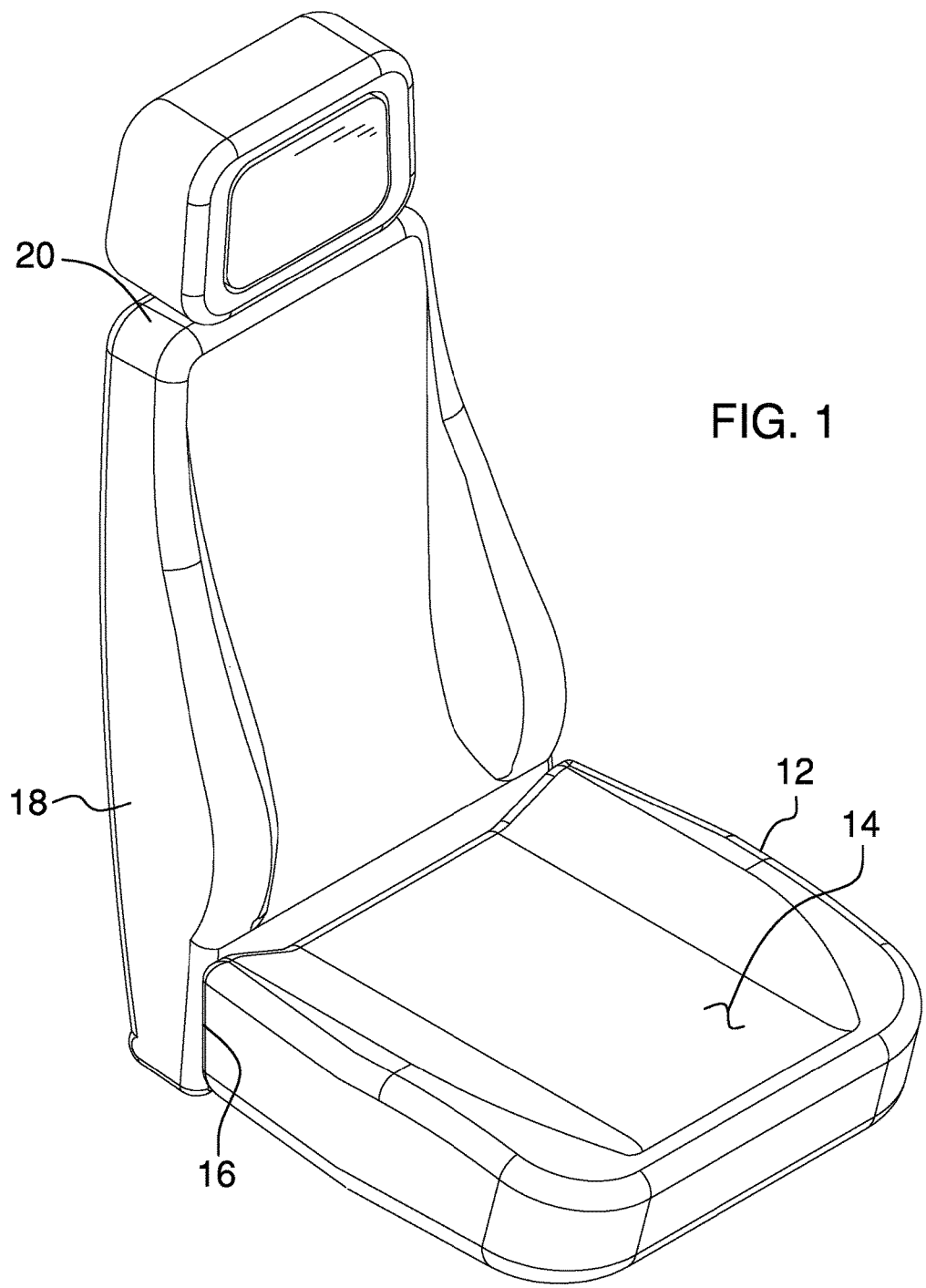
FIG. 1 is a front perspective view of a dual configuration headrest system according to an embodiment of the disclosure.
Figure 2:
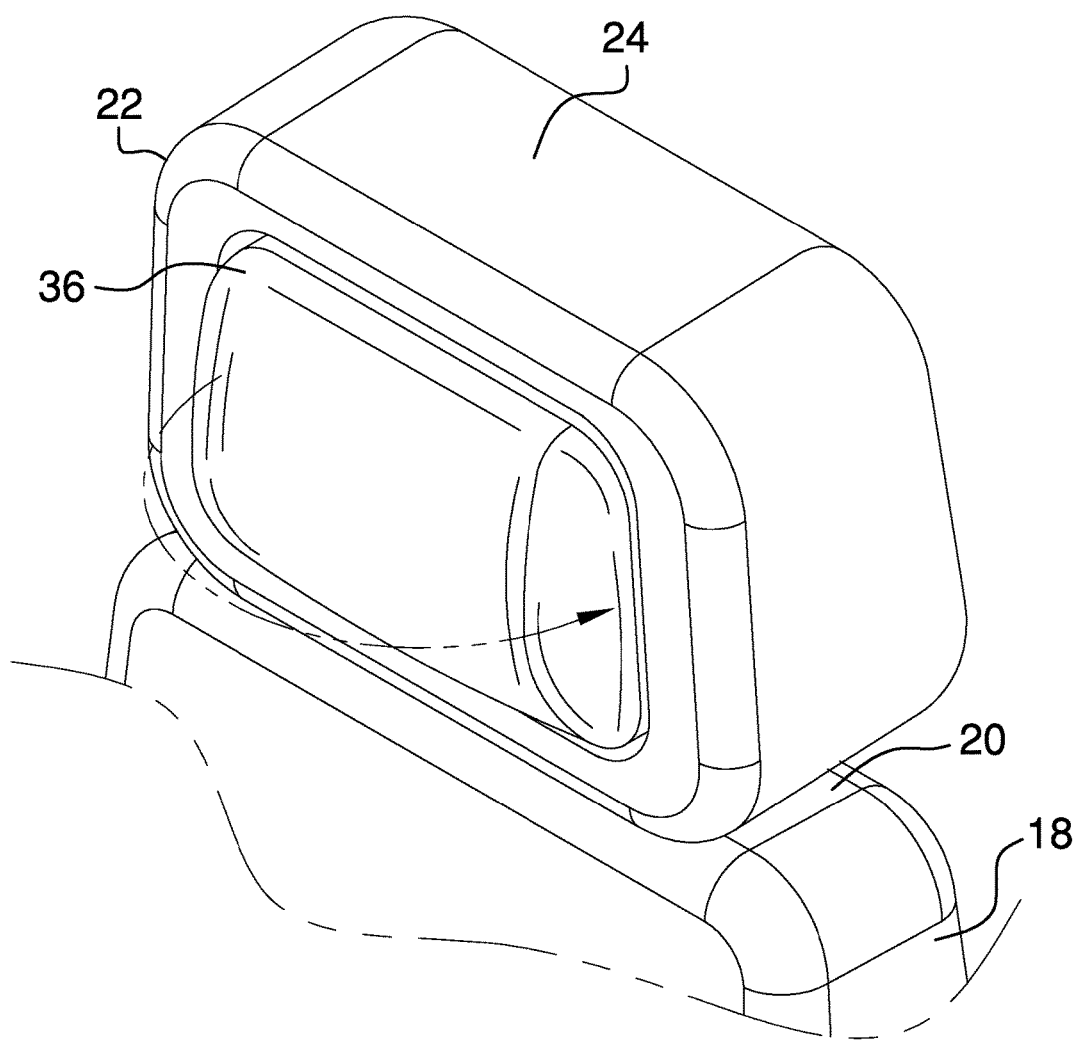
FIG. 2 is a front perspective view of an embodiment of the disclosure.
Figure 3:
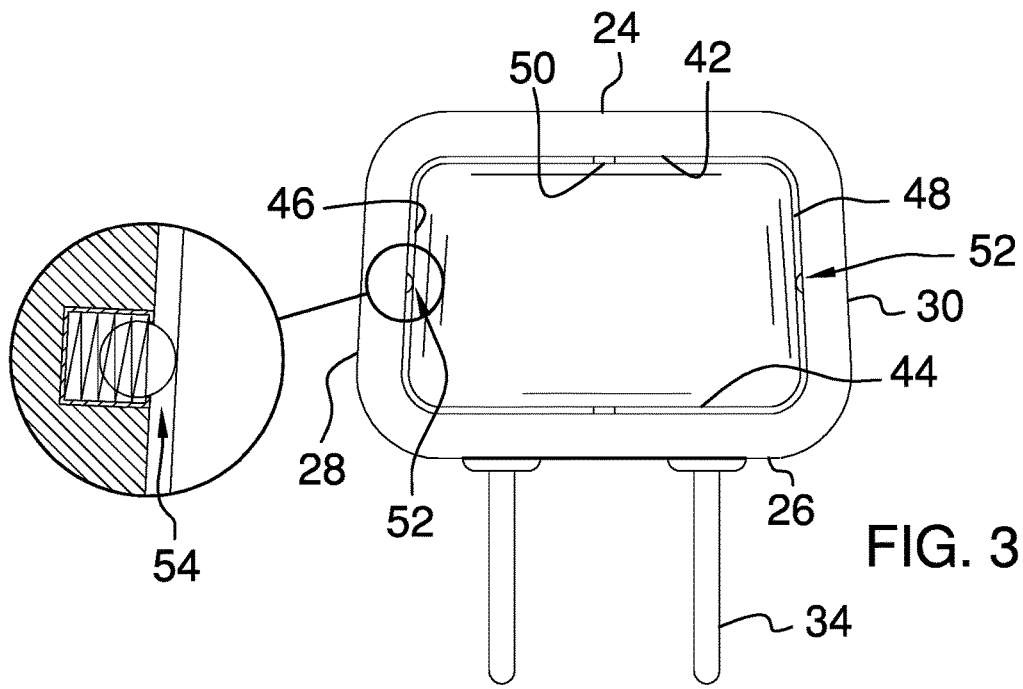
FIG. 3 is a front view of an embodiment of the disclosure.
Figure 4:
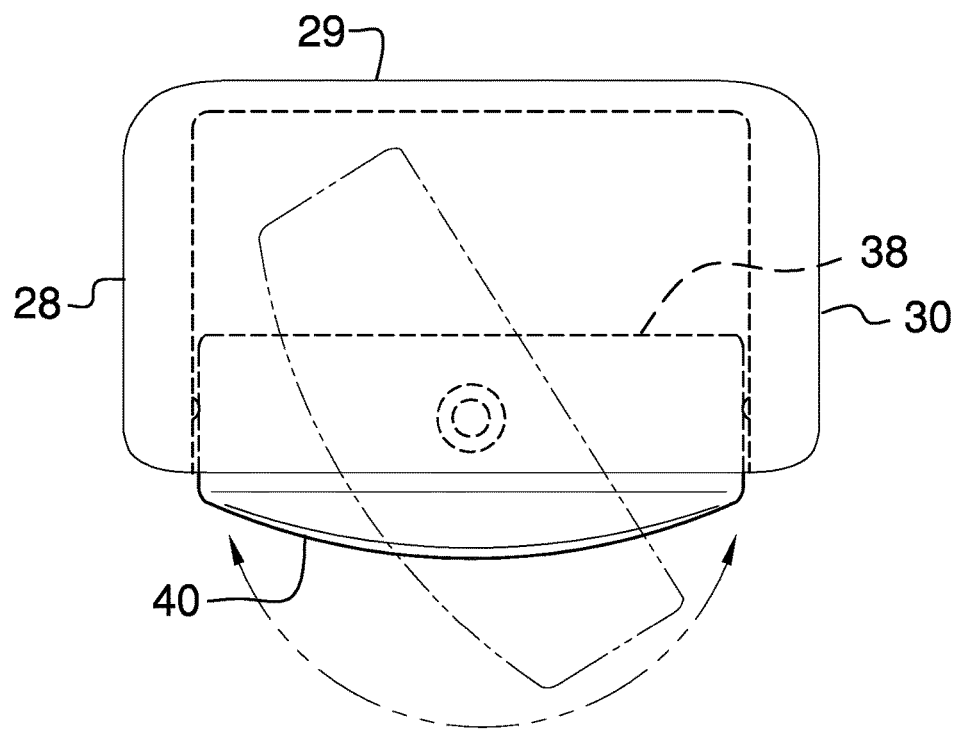
FIG. 4 is a top view of an embodiment of the disclosure.
Figure 5:
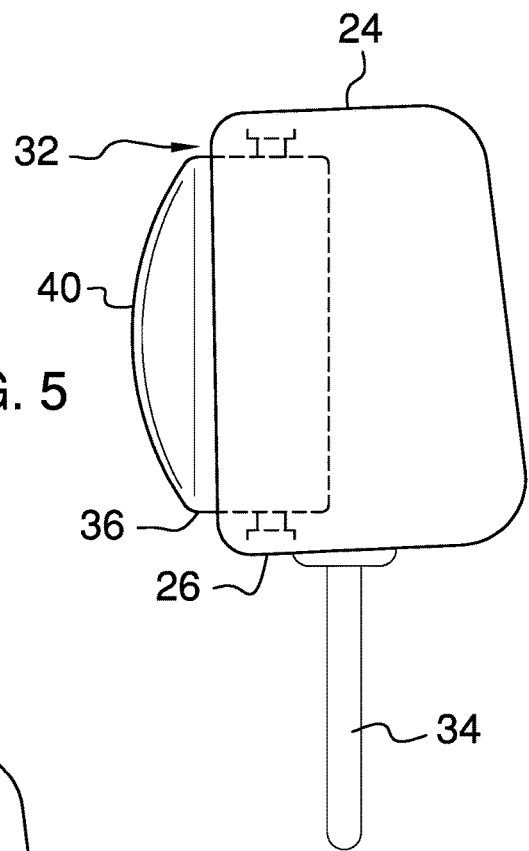
FIG. 5 is a side view of an embodiment of the disclosure.
Figure 6:
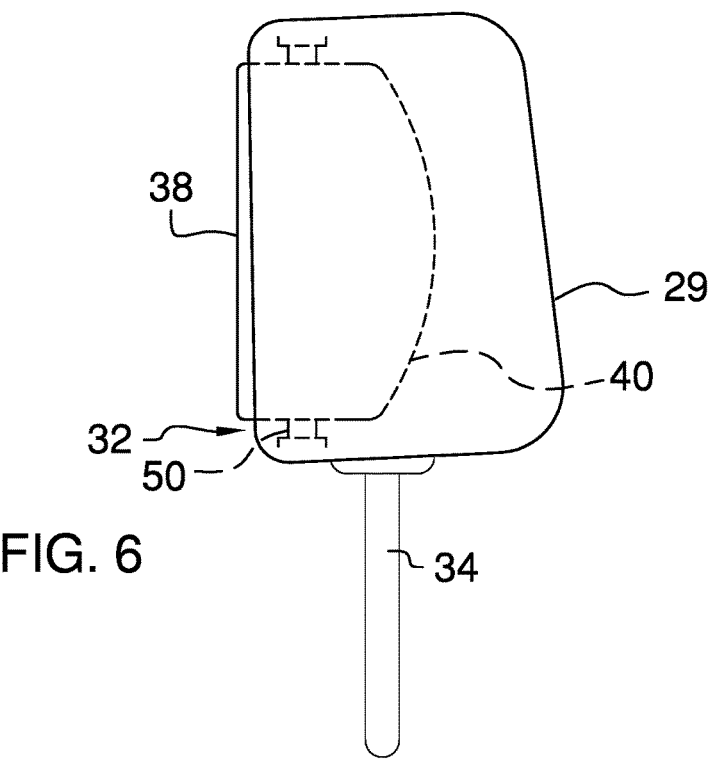
FIG. 6 is a side view of an embodiment of the disclosure.

With reference now to the drawings, and in particular to FIGS. 1 through 6 thereof, a new chair headrest device embodying the principles and concepts of an embodiment of the disclosure and generally designated by the reference numeral 10 will be described.

As best illustrated in FIGS. 1 through 6, the dual configuration headrest system 10 generally comprises a seat 12 having a top side 14 and a back edge 16. A backrest 18 is attached to the seat 12 adjacent to the back edge 16 and extends upwardly from the top side 14. The seat 12 and backrest 18 form a conventional chair and more particularly a chair that is used by a passenger of a vehicle, train, plane or the like used typically for travel for longer periods of time. Typically, however, the system 10 will be used with a motor vehicle.

A housing 22 is attached the backrest 18 and is positioned over an upper edge 20 of the backrest 18. The housing 22 has a top wall 24, a bottom wall 26, first lateral wall 28 and a second lateral wall 30. A front side 32 of the housing 22 is open. A back side 29 of the housing 22 may be open or may be closed or open. The housing 22 may be mounted on one or more rods 34 that extend into the backrest 18 and allow the housing 22 to be adjusted vertically relative to the backrest 18 as is conventionally found with headrest devices.

A head support 36 is mounted within the housing 22. The head support 36 has a first side 38 and a second side 40 positioned opposite of each other. The head support 36 further has a top side 42, a bottom side 44, a first lateral side 46 and a second lateral side 48. The head support 36 is rotationally mounted within the housing 22 such that the first side 38 or the second side 40 is positioned in an opening in the front side 32 when the head support 36 is rotated relative to the housing 22. This may be accomplished with a spindle 50 extending through the top 42 and bottom 44 sides which is rotatably mounted to the top 24 and bottom 26 walls. Alternatively the spindle 50 may be a pair of spindles or the spindle(s) may be horizontally oriented instead of vertically. The first side 38 is substantially planar and the second side 40 is convexly arcuate. The second side 40 is resiliently compressible and may comprise a memory foam material. The first side 38 may also be resiliently compressible or may be comprised of a more rigid material.

A locking member 52 is mounted in the housing 22 and releasably retains the head support 36 in a first position having the first side 38 facing outwardly of the housing 22 or in a second position having the second side 40 facing outwardly of the housing, wherein the second side 40 extends outwardly away from the housing 22. The locking member 52 may include a detent 54 positioned in the first lateral wall 28. The detent 54 is frictionally engaged with the first lateral side 46 or the second lateral side 48 of the head support 36. As can be seen in the figure, the detent 54 may include a spring loaded bearing which abuts the head support 36 and there may be a second locking member 52. Alternative locking members may instead engage the spindle 50. The locking member 52 essentially prevents unwanted rotation of the head support 36 while in use.

In use, the system 10 is used as a conventional chair and headrest combination but the head support 36 allows the user to select what type of support they desire. This may include a rounded support, or second side 40, into which their head will sink as the head support 36 contours to the shape of their head, or a more upright position utilizing the first side 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A passenger chair assembly comprising:
a seat having a top side and a back edge;
a backrest being attached to said seat adjacent to said back edge and extending upwardly from said top side;
a housing being attached to said backrest and being positioned over an upper edge of said backrest, said housing having a top wall, a bottom wall, first lateral wall and a second lateral wall, a front side of said housing defining an opening facing towards said seat and extending partially into said housing such that a rear side of said housing is closed; and
a head support being mounted within said housing wherein said head support is exposed in said housing facing towards said seat, said head support having a first side and a second side positioned opposite of each other, said head support further having a top side, a bottom side, a first lateral side and a second lateral side, said head support being rotationally mounted within said housing such that said first side or said second side is positioned in said opening in said front side when said head support is rotated relative to said housing.

2. The passenger chair assembly according to claim 1, wherein said first side is planar and said second side is convexly arcuate.

3. The passenger chair assembly according to claim 2, wherein said second side is resiliently compressible.

4. The passenger chair assembly according to claim 2, further including a locking member being mounted in said housing and releasably retaining said head support in a first position having said first side facing outwardly of said housing or in a second position having said second side facing outwardly of said housing.

5. The passenger chair assembly according to claim 4, wherein said locking member includes a detent positioned in said first lateral wall, said detent being frictionally engaged with said first lateral side or said second lateral side of said head support.

6. The passenger chair assembly according to claim 1, further including a locking member being mounted in said housing and releasably retaining said head support in a first position having said first side facing outwardly of said housing or in a second position having said second side facing outwardly of said housing.

7. The passenger chair assembly according to claim 6, wherein said locking member includes a detent positioned in said first lateral wall, said detent being frictionally engaged with said first lateral side or said second lateral side of said head support.

8. A passenger chair assembly comprising:
a seat having a top side and a back edge;
a backrest being attached to said seat adjacent to said back edge and extending upwardly from said top side;
a housing being attached to said backrest and being positioned over an upper edge of said backrest, said housing having a top wall, a bottom wall, first lateral wall and a second lateral wall, a front side of said housing defining an opening facing towards said seat and extending partially into said housing such that a rear side of said housing is closed;
a head support being mounted within said housing wherein said head support is exposed in said housing facing towards said seat, said head support having a first side and a second side positioned opposite of each other, said head support further having a top side, a bottom side, a first lateral side and a second lateral side, said head support being rotationally mounted within said housing such that said first side or said second side is positioned in said opening in said front side when said head support is rotated relative to said housing, said first side being substantially planar, said second side being convexly arcuate;
said second side being resiliently compressible; and
a locking member being mounted in said housing and releasably retaining said head support in a first position having said first side facing outwardly of said housing or in a second position having said second side facing outwardly of said housing, said locking member including a detent positioned in said first lateral wall, said detent being frictionally engaged with said first lateral side or said second lateral side of said head support.

* * * * *